3,520,162
CIRCUIT ARRANGEMENT FOR LIQUID
PRESSURE FORMING SHEET METAL
Frank Früngel, Herwigredder 105a,
Hamburg-Rissen, Germany
Filed Jan. 17, 1966, Ser. No. 520,939
Claims priority, application Germany, Jan. 16, 1965,
F 44,984
Int. Cl. B21d 26/12
U.S. Cl. 72—56    4 Claims

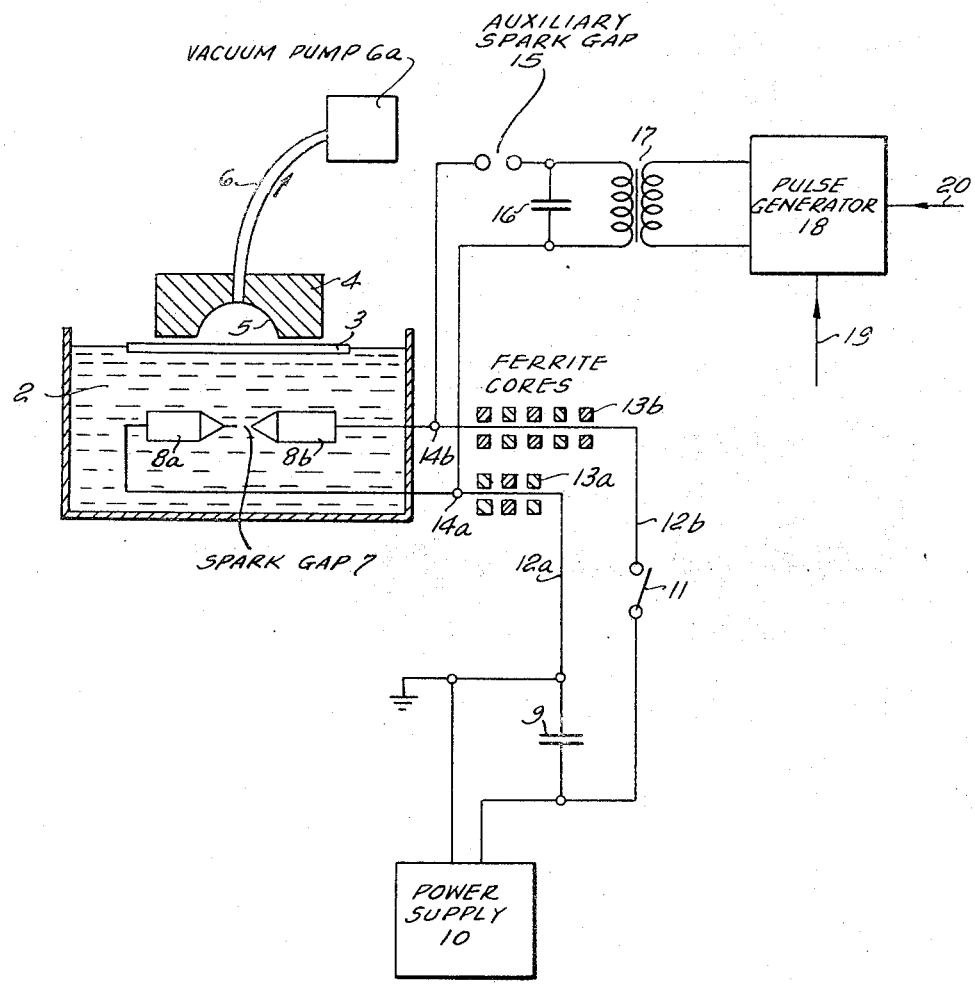

ABSTRACT OF THE DISCLOSURE

An arrangement for forming sheet metal through the generation of a pressure wave within a fluid. The sheet metal to be formed is immersed in the fluid and spread over the mold against which it is to be formed. A pair of spark electrodes in the fluid are controlled through an auxiliary electronic circuit to generate a spark. When properly generated as a function of time, the spark gives rise to a pressure wave transmitted through the fluid and against the sheet metal. The action of the pressure wave against the surface of the sheet metal forces the latter to bear against the mold and thus become formed. A high voltage low energy source starts the spark across the spark gap between the electrodes. Once this spark has been started, a low voltage high energy source becomes discharged across the spark gap to generate the pressure wave. The high voltage low energy source starts the spark but cannot provide the energy required to generate the pressure wave. The low voltage high energy source is inadequate to start the spark, but is able to provide sufficient energy to propagate the pressure wave.

---

The present invention relates to a circuit arrangement for the liquid pressure forming of sheet metal. More particularly, the invention relates to a circuit arrangement for the forming of sheet metal in water by pressure produced by a spark in the water.

Apparatus for the forming of sheet metal in water by pressure produced by a spark in the water facilitates the repeating of the process. The liquid pressure forming process is more reliable, the greater the spark potential. The potential for the spark is usually provided by a capacitor which is customarily operated at a charge voltage of approximately 20 kilovolts. If less than 20 kilovolts of charge voltage is utilized, it becomes more difficult, in correspondence with the decreasing magnitude of such charge voltage, to produce a spark in the spark gap between the spark electrodes. At such lower charge voltages, in order to produce a spark it is necessary to provide a vaporizable electrical conductor across the spark gap between the spark electrodes, connected to both spark electrodes. An alternative is to make one or both spark electrodes movable, so that the spark gap may be adjusted to a small initial width. These expedients make the repeating of the forming process complex, difficult and expensive. When the charge voltage is less than 5 kilovolts, it is very difficult and practically impossible to produce a spark and a vaporizable conductor or movable electrodes are a necessity. Furthemore, water, which is usually the liquid in which the spark is produced, has a rather high electrolytic conductivity and therefore precludes the utilization of spark production methods which are usually utilized in a gas.

The efficiency or effectiveness of the metal forming operation, which is the ratio of the forming energy at the metal sheet to the charge energy stored in the capacitor, increases as the capacitor charge decreases at the same charging energy. This is due to the fact that at the same charging energy and at a smaller voltage, the capacitor is larger. Furthermore, at the same configuration of the discharge circuit or at the same inductivity, the discharge decreases and the time of pressure increases and to reach the maximum pressure corresponds increasingly more closely to the speed at which the metal sheet is moved or formed during the forming operation.

Excessively great pressures or shock waves must be avoided, since they are dissipated too rapidly to form the metal. Thus, known liquid pressure metal forming systems are unable to produce reliable high energy sparks in liquid at low capacitor voltages without utilizing a vaporizable conductor or movable spark electrodes.

The principal object of the present invention is to provide a new and improved circuit arrangement for the liquid pressure forming of sheet metal.

An object of the present invention is to provide a circuit arrangement for the liquid pressure forming of sheet metal which produces a reliable high energy spark in the liquid at low capacitor voltage without utilizing a vaporizable conductor or movable spark electrodes.

Another object of the present invention is to provide a circuit arrangement for the liquid pressure forming of sheet metal which permits the repeating of the forming process with facility, simplicity and economy.

Another object of the present invention is to provide a circuit arrangement for the liquid pressure forming of any suitable formable material and for the production of very strong pressure waves in water for seismological, geophysical, search, navigational and signal and communication purposes.

In accordance with the present invention, a circuit arrangement for liquid pressure forming of sheet metal comprises a vessel containing a liquid. A metal sheet is positioned in the liquid in the vessel. A mold is positioned adjacent the metal sheet. A pair of spark electrodes are positioned in the liquid in the vessel spaced from the metal sheet and spaced from each other to form a spark gap between them. A main capacitor produces a discharge current and discharge voltage of insufficient magnitude to produce a spark across the spark gap between the spark electrodes. Electrical conductors connect the main capacitor to the spark electrodes thereby providing a discharge circuit for the main capacitor. An inductance arrangement positioned in operative proximity with the electrical conductors between the main capacitor and the spark electrodes comprises material having an inductance dependent upon the discharge current of the main capacitor flowing through the electrical conductors. A starting circuit produces a pulse of high intensity and short duration which is of sufficient magnitude to produce a spark between the spark electrodes across the spark gap but which is insufficient to produce a pressure wave in the liquid sufficient to form the metal sheet. Further electrical conductors connect the starting circuit to the spark electrodes whereby the starting circuit produces a spark across the spark gap between the spark electrodes thereby closing the discharge circuit of the main capacitor so that the discharge current of the main capacitor flows through the discharge circuit across the spark gap and produces a pressure wave in the liquid sufficient to form the metal sheet in cooperation with the mold.

A switch is interposed in the electrical conductors for connecting the main capacitor to the discharge circuit after a spark is produced across the spark gap between the spark electrodes. The inductance arrangement comprises a plurality of ferrite rings having an inductance which is very high when no current flows through the electrical conductors and reaching magnetic saturation so that the inductance is substantially eliminated when the discharge current flows through the electrical conductors.

In order that the present invention may be readily carried into effect it will now be described with reference to the accompanying drawings, wherein the single figure is a circuit arrangement of the present invention for the liquid pressure forming of sheet metal including a schematic diagram, partly in section, of pressure forming apparatus.

In the figure, a vessel or tank 1 contains a liquid 2 such as, for example, water. A metal sheet or other suitable formable material 3 is positioned in the water 2 just beneath the surface thereof. A mold 4 has an inner surface configuration 5 formed therein. The inner configuration 5 is maintained in evacuated condition by a vacuum pump 6a which is connected to the inner configuration 5 by a conduit 6.

A pair of spark electrodes 8a and 8b are positioned in the water 2 at a distance 7 from each other which is the spark gap. When a spark is produced between the spark electrodes 8a and 8b across the spark gap 7, the spark produces a pressure wave or shock wave in the water 2. Electrical energy is supplied to the spark electrodes 8a and 8b by a main capacitor 9, which may comprise a bank of capacitors. The main capacitor 9 is charged by a power supply 10 which may comprise any suitable source of electrical energy.

The main capacitor 9 is connected to the spark electrodes 8a and 8b via a switch 11 and the leads 12a and 12b, the lead 12a being connected from one plate of said capacitor to the spark electrode 8a and the lead 12b being connected from the other plate of said capacitor to the spark electrode 8b through said switch. The switch 11 keeps the discharge circuit of the main capacitor 9 open until said capacitor is ready to discharge.

The leads 12a and 12b are electrical conductors with large diameters and as free from inductane as possible in order to enable them to conduct the discharge current, which may be as high as 100,00 amps, from the main capacitor 9 to the spark electrodes 8a and 8b. A plurality of spaced ferrite rings 13a are coaxially positioned around the lead 12a and/or a plurality of spaced ferrite rings 13b are coaxially positioned around the lead 12b. The ferrite rings 13a and 13b provide current-dependent inductance. The ferrite rings 13a and 13b may be replaced by ferrite in other configurations such as, for example, blocks or cylinders. The ferrite may be replaced by any suitable material having a very high initial magnetic permeability which reaches magnetic saturation at a relatively low strength of the magnetic field so that the operative permeability of such material is equal to that of air. A suitable replacement material for the ferrite thus comprises, for example, iron or a soft-magnetic material including nickel.

The ferrite rings 13a and/or 13b thus provide a very high inductance between the main capacitor 9 and points 14a and 14b of the discharge circuit when the circuit is in its initial condition and no current flows in the discharge circuit, due to the very high inductance of the ferrite when there is no current flow in the leads 12a and 12b. The very high inductance is substantially eliminated upon magnetic saturation of the ferrite rings when the discharge current of the main capacitor 9 flows through the leads 12a and 12b.

The spark between the spark electrodes 8a and 8b is produced by a very high intensity pulse of very short duration which is supplied to the spark electrode 8b by a start capacitor 16 via an auxiliary spark gap 15. The start capacitor 16 is charged by a pulse generator 18 via a pulse transformer 17. The charging circuit for the main capacitor 9 and the start capacitor 16 need not be those of the figure, but may comprise any suitable charging circuits such as, for example, Marx cascade circuits. The pulse generator 18 may include a thyratron which is fired or switched to its conductive condition by a signal supplied thereto via a signal lead 19. The pulse generator 18 is energized via a power lead 20.

In operation, the main capacitor 9 is charged to a charge voltage of, for example, 1,000 volts. The switch 11 is kept open until the main capacitor 9 is fully charged, at which time said switch is closed. When the switch 11 is closed, a small electrolytic discharge current flows between the spark electrodes 8a and 8b. The electrolytic discharge current is not large enough to produce magnetic saturation of the ferrite rings 13a and 13b.

The pulse generator 18 is energized such as, for example, by firing of the thyratron, and charges the start capacitor 16 via the pulse transformer 17. The start capacitor 16 is charged to its full charge voltage of 60 to 80 kilovolts in $10^{-5}$ second or less, in accordance with plates and spacing of the plates of said start capacitor. The sparkover voltage of the auxiliary spark gap 15 is slightly less than the charge voltage of the start capacitor 16. Thus, as soon as the start capacitor 16 is charged to a charge voltage just below its maximum charge voltage, said capacitor produces a spark across the auxiliary spark gap 15.

As a result of the very high peak voltage produced by the discharging of the start capacitor 16, a spark is produced across the spark gap 7 between the spark electrodes 8a and 8b by said capacitor. The spark produced by the start capacitor 16, via the common points 14a and 14b of the discharge circuits of the main and start capacitors, has a relatively low energy and is not sufficient to produce a suitable pressure wave in the water 2. Although the spark across the spark gap 7 has insufficient energy to produce a suitable pressure wave, it produces a pressure wave which is suitable for forming a very thin sheet of metal such as, for example, tin foil or the like, although such pressure wave is insufficient for forming a sheet of metal 3.

Upon the production of a spark across the spark gap 7 by the start capacitor 16, the switch 11 is closed either manually or by suitable automatic means such as, for example, a relay energized by the discharge current of said capacitor. When the switch 11 is closed, the main capacitor 9 discharges through its discharge circuit which is then closed by the spark across the spark gap 7 as well as said switch. The spark across the spark gap 7 usually continues for $10^{-4}$ second, due to the ions of the liquid 2 which maintain the spark at a suitable size, necessary to conduct the main capacitor 9 discharge current, between the spark electrodes 8a and 8b. The flow of the discharge current of the main capacitor 9 between the spark electrodes 8a and 8b produces a suitable and sufficient pressure wave in the water 2 which is directed suitably and which forms the sheet metal 3. The pressure wave thus produced is exceptionally effective in forming the metal sheet 3. Various reflectors and the like may be utilized, if desired, as is usual in the explosive deformation metal forming process.

The circuit arrangement of the present invention permits the selection of the charge voltage of the main capacitor 9 as desired, without variation of the spacing between the spark electrodes 8a and 8b, so that any magnitude of charge voltage, low, medium or high may be utilized. This permits a great variation of the energy in a manner which provides optimum deformation of the sheet of metal 3. The considerably greater energy provided by the circuit arrangement of the present invention results in great economy of operation. The exceptional economy of operation is due to the pressure wave produced in the water 2 being at least as effective as, if not more effective than and having about 8 times the energy of, the pressure wave so produced when the charge voltage is 20 kilovolts, as in similar metal forming systems of the prior art, although the charge voltage of the main capacitor 9 of the circuit arrangement of the present invention is only 1 or 2 kilovolts. There is thus a considerable saving of electrical input energy or power.

There is a difference in dimensioning of the spark gap in a spark producing system dependent upon whether the sparkover is to occur in a liquid or in a gas. If a system utilized to produce a spark in a gas is utilized instead to produce a spark in water, the operation of the system is unpredictable and unreliable. This is due to the high electrolytic conductivity of the water between the spark electrodes. Even if a liquid other than water is utilized, the spark is produced after a few spark discharges due to suspension of the electrolyte in the liquid. If a discharge current of approximately 10 amps is produced between the spark electrodes by a charge voltage of 1 kilovolt, the liquid has a resistance of approximately 100 ohms and at a charge voltage of 60 kilovolts the discharge current is approximately 6,000 amps. This would require a pulse generator 18 which can provide a peak power of 360 megawatts. The pulse produced need have a duration of 1 microsecond, so that the power requirement is 360 wattseconds.

The impedance of the leads between the pulse transformer 17 or the start capacitor 16 and the spark electrodes 8a and 8b should be matched to the impedance of the spark produced across the spark gap 7 or should have a lower magnitude than said impedance of the spark. If the leads are not so matched, the discharge current would be dissipated in inductance and there would be no effective spark produced. Peak power of the aforementioned magnitude are attained with facility by the circuit arrangement of the present invention when the start capacitor 16 comprises a bank of capacitors having a low inductance and the spark gap circuit has a low impedance. The construction of suitable spark gaps is disclosed in Fruengel, Impulstechnik, Erzeugung und Anwendung von Kondensatorentladungen, Akademische Verlagsgesellschaft, Leipzig, 1960.

The switch 11 prevents an undesirable current loss due to electrolytic conductivity. The switch 11 may comprise a suitable electronic switch such as, for example, a gas tube such as an ignition. The utilization of an ignition as the switch 11 is not practical at very low charge voltages of about 1 or 2 kilovolts, since the additional ignition requirement at such low voltages creates difficulties. If it is not practical to utilize an ignition, a mechanical switch such as, for example, a vibration switch, may be utilized.

While the invention has been described by means of a specific example and in a specific embodiment, I do not wish to be limited thereto, for obvious modifications will occur to those skilled in the art without departing from the spirit and scope of the invention.

What I claim is:

1. A circuit arrangement for liquid pressure forming of sheet metal, comprising a vessel containing a liquid; a metal sheet positioned in the liquid in the vessel; molding means positioned adjacent said metal sheet; a pair of spark electrodes in said liquid in said vessel spaced from said metal sheet and spaced from each other to form a spark gap between them; main capacitor means connected across said electrodes and producing a discharge current and discharge voltage of insufficient magnitude to produce a spark across said spark gap between said spark electrodes; electrical conductor means for connecting said main capacitor means to said spark electrode and thereby provide a discharge circuit for said main capacitor means; inductance means positioned in operative proximity with said electrical conductor means between said main capacitor means and said spark electrodes for applying a high voltage across the spark gap of said electrodes, said inductance means comprising material having a variable inductance dependent upon the discharge current of said main capacitor means flowing through said electrical conductor means, said inductance means comprising further a plurality of ferrite rings having an inductance which is very high when no current flows through said electrical conductor means and reaching magnetic saturation so that the inductance is substantially eliminated when the discharge current flows through the electrical conductor means; electronic starting means connected across said electrodes and producing a pulse of high intensity and short duration which is of sufficient magnitude to produce a spark between said spark electrode across said spark gap but which is insufficient to produce a pressure wave in said liquid sufficient to form said metal sheet; and further electrical conductor means connecting said starting means to said spark electrodes whereby said starting means of relatively high voltage produces a spark across said spark gap between said spark electrodes thereby closing the discharge circuit of said main capacitor means of relatively low voltage so that the discharge current of said main capacitor means flows through said discharge circuit across said spark gap and produces in said liquid a pressure wave from a single discharge sufficient to form said metal sheet in cooperation with said molding means, said pressure wave having an intensity increasing as a predetermined function of time corresponding to the speed at which said metal sheet is formable against said molding means.

2. A circuit arrangement as claimed in claim 1, further comprising switch means interposed in said electrical conductor means for connecting said main capacitor means to said discharge circuit after a spark is produced across said spark gap between said spark electrodes.

3. A circuit arrangement as claimed in claim 1 wherein said further electrical conductor means has an electrical impedance matching the electrical impedance of said spark gap.

4. A circuit arrangement as claimed in claim 1, wherein the space between said spark electrodes remains constant and wherein the magnitude of the pulse produced by said starting means is sufficient to aid the discharge current of said main capacitor means in producing a pressure wave in said liquid sufficient to form said metal sheet in cooperation with said molding means.

References Cited

UNITED STATES PATENTS

| | | | |
|---|---|---|---|
| 3,093,770 | 6/1963 | Wesley et al. | 72—56 |
| 3,232,085 | 2/1966 | Inoue | 72—56 |
| 3,234,429 | 2/1966 | Schrom | 72—56 |

FOREIGN PATENTS

| | | |
|---|---|---|
| 1,171,090 | 5/1964 | Germany. |

RICHARD J. HERBST, Primary Examiner